United States Patent
Qiu et al.

(10) Patent No.: US 11,547,147 B2
(45) Date of Patent: Jan. 10, 2023

(54) BOOSTER CIRCUIT, BATTERY DEVICE AND ELECTRONIC CIGARETTE

(71) Applicant: JOYETECH EUROPE HOLDING GMBH, Zug (CH)

(72) Inventors: Weihua Qiu, Changzhou (CN); Hansen Chen, Changzhou (CN)

(73) Assignee: JOYETECH EUROPE HOLDING GMBH, Zug (CH)

( * ) Notice: Subject to any disclaimer, the term of this patent is extended or adjusted under 35 U.S.C. 154(b) by 422 days.

(21) Appl. No.: 16/641,230

(22) PCT Filed: Dec. 13, 2017

(86) PCT No.: PCT/CN2017/115837
§ 371 (c)(1),
(2) Date: Feb. 21, 2020

(87) PCT Pub. No.: WO2019/037341
PCT Pub. Date: Feb. 28, 2019

(65) Prior Publication Data
US 2020/0214354 A1    Jul. 9, 2020

(30) Foreign Application Priority Data

Aug. 21, 2017   (CN) .......................... 201721051102.1

(51) Int. Cl.
*A24F 40/50* (2020.01)
*A24F 40/40* (2020.01)
(Continued)

(52) U.S. Cl.
CPC .............. *A24F 40/50* (2020.01); *A24F 40/40* (2020.01); *H02J 7/0063* (2013.01); *H02M 1/32* (2013.01); *H02M 3/00* (2013.01); *H02M 3/04* (2013.01)

(58) Field of Classification Search
CPC ..................................................... H02M 1/322
See application file for complete search history.

(56) References Cited

U.S. PATENT DOCUMENTS 4,890,210 A * 12/1989 Myers ............... H02M 3/33507
363/61
6,262,897 B1 * 7/2001 Yasumura ........... H02M 3/3385
363/21.02

(Continued)

FOREIGN PATENT DOCUMENTS

CN          203504217 U      3/2014
CN          104055224 A      9/2014
(Continued)

*Primary Examiner* — Adam D Houston
(74) *Attorney, Agent, or Firm* — Cheng-Ju Chiang

(57) ABSTRACT

The present invention relates to the technical field of electronics, and provides a boosting circuit, a battery device, and an electronic cigarette. An output end of the boosting module is connected to a first end of the protection capacitor; an anode of the rectifier diode is connected to a second end of the protection capacitor, and a cathode of the rectifier diode is connected to the first end and a load of the voltage feedback module; the second end of the voltage feedback module is connected to a feedback end of the boosting module and a first end of the output control resistor, and a second end of the output control resistor is grounded; an enabling end of the boosting module is connected to a controller.

14 Claims, 3 Drawing Sheets

(51) Int. Cl.
*H02J 7/00* (2006.01)
*H02M 1/32* (2007.01)
*H02M 3/04* (2006.01)
*H02M 3/00* (2006.01)

(56) References Cited

U.S. PATENT DOCUMENTS

| | | | | |
|---|---|---|---|---|
| 7,233,112 | B2* | 6/2007 | Burke | H05B 39/047 |
| | | | | 315/307 |
| 7,379,310 | B2* | 5/2008 | Louvel | H02M 1/32 |
| | | | | 361/18 |
| 8,975,828 | B2* | 3/2015 | Cao | H05B 45/38 |
| | | | | 315/274 |
| 2014/0258741 | A1* | 9/2014 | Xiang | G06F 1/24 |
| | | | | 713/300 |
| 2014/0360512 | A1* | 12/2014 | Xiang | A24F 40/50 |
| | | | | 131/328 |
| 2020/0107582 | A1* | 4/2020 | Mizuguchi | A24F 40/10 |
| 2020/0112253 | A1* | 4/2020 | Veselic | H02M 3/1582 |
| 2020/0214354 | A1* | 7/2020 | Qiu | A24F 40/40 |
| 2020/0221780 | A1* | 7/2020 | Qiu | H02J 7/00309 |
| 2020/0237012 | A1* | 7/2020 | Yamada | A24F 40/57 |
| 2020/0237013 | A1* | 7/2020 | Yamada | H05B 1/0244 |
| 2020/0359700 | A1* | 11/2020 | Qiu | H02M 3/158 |
| 2020/0404972 | A1* | 12/2020 | Turbi | A24F 40/51 |
| 2021/0120879 | A1* | 4/2021 | Zhu | A61L 2/10 |
| 2021/0120880 | A1* | 4/2021 | Liu | H02M 1/0025 |
| 2021/0127754 | A1* | 5/2021 | Tatsuta | A24F 40/90 |
| 2021/0178161 | A1* | 6/2021 | Baru | A61N 1/36175 |
| 2021/0203231 | A1* | 7/2021 | Lula | H02M 1/0032 |
| 2021/0298356 | A1* | 9/2021 | Qiu | B65B 39/00 |
| 2022/0007740 | A1* | 1/2022 | Lin | A24F 40/53 |
| 2022/0014097 | A1* | 1/2022 | Ono | H02J 7/0063 |
| 2022/0095678 | A1* | 3/2022 | Fujinaga | A24F 40/20 |
| 2022/0095691 | A1* | 3/2022 | Fujinaga | A24F 40/46 |
| 2022/0123581 | A1* | 4/2022 | Clarke | H01M 10/623 |
| 2022/0141930 | A1* | 5/2022 | Ye | H05B 45/375 |
| | | | | 315/307 |

FOREIGN PATENT DOCUMENTS

| | | | | |
|---|---|---|---|---|
| CN | 205052879 U | | 3/2016 | |
| CN | 205987969 U | | 3/2017 | |
| CN | 207265866 U | * | 4/2018 | ............ A24F 40/40 |
| CN | 215775587 U | * | 2/2022 | |
| WO | 2010/095112 A1 | | 8/2010 | |
| WO | WO-2019037341 A1 | * | 2/2019 | ............ A24F 40/40 |

* cited by examiner

BOOSTER CIRCUIT, BATTERY DEVICE AND ELECTRONIC CIGARETTE

CROSS REFERENCE TO RELATED APPLICATION

The present application is a 35 U.S.C. § 371 National Phase conversion of International Patent Application No. PCT/CN2017/115837, filed on Dec. 13, 2017, which is based on and claims priority of Chinese patent application No. 201721051102.1, filed on Aug. 21, 2017. The entire disclosure of the above-identified application is hereby incorporated by reference herein and made a part of this specification. The PCT International Patent Application was filed and published in English.

FIELD OF THE INVENTION

The invention relates to the technical field of electronics, in particular to a booster circuit, a battery device and an electronic cigarette.

BACKGROUND OF THE INVENTION

E-cigarette is an electronic product that mimics a cigarette, typically consisting of an atomizer and a battery device. The atomizer is used as an atomization assembly of the electronic cigarette, and can generate smoke when it is powered on; the battery device is used as a power source control assembly of the electronic cigarette, and supplies a working voltage to the atomizer.

The battery device of the electronic cigarette is generally provided with a booster circuit, which mainly includes a boosting module and a diode, wherein the battery in the battery device is connected in series with the boosting module, the diode, and the load in the battery device.

In the process of implementing the present disclosure, the inventors found that at least the following problems exist:

In the actual production assembly process of the battery device, the load is short-circuited to the ground, resulting in the battery being connected in series with the boosting module, the diode and the ground, and the resistance in the entire booster circuit is relatively small, thereby causing the current in the booster circuit instantly increase and burn out the components in the booster circuit.

SUMMARY OF THE INVENTION

In order to overcome the problem that the battery device existing in the related art is in the actual production assembly process, when the load is short-circuited to the ground, causing the current in the booster circuit to instantaneously increase and burn out the components in the booster circuit, the present disclosure provides a booster circuit, a battery device, and an electronic cigarette. The technical solution is as follows:

According to a first aspect of an embodiment of the present disclosure, there is provided a booster circuit including a boosting module, a protection capacitor, a rectifier diode, a voltage feedback module, and an output control resistor, wherein:

a power input end of the boosting module is electrically connected to a power source, an output end of the boosting module is electrically connected to a first end of the protection capacitor, and a second end of the protection capacitor is grounded;

an anode of the rectifier diode is electrically connected to the second end of the protection capacitor, and a cathode of the rectifier diode is electrically connected to a first end of the voltage feedback module, respectively, wherein conduction direction of the rectifier diode is the direction in which the anode is directed to the cathode thereof;

a second end of the voltage feedback module is electrically connected to a feedback end of the boosting module and a first end of the output control resistor, and a second end of the output control resistor is grounded;

an enable end of the boosting module is electrically connected to a controller, and a ground end of the boosting module is grounded;

the protection capacitor is configured to block the power source from directly discharging to the ground when the load is short-circuited.

Optionally, the booster circuit further includes a grounding diode;

a cathode of the grounding diode is electrically connected to the second end of the protection capacitor, and an anode of the grounding diode is grounded, wherein the conducting direction of the grounding diode is the direction in which the cathode is directed to the anode thereof.

Optionally, the boosting module includes an inductor and a boost converter;

a first end of the inductor and a power input end of the boost converter are electrically connected to the power source, and a second end of the inductor and an output end of the boost converter are electrical connected to the first end of protection capacitor;

a feedback end of the boost converter is electrically connected to the second end of the voltage feedback module and the first end of the output control resistor;

an enable end of the boost converter is electrically connected to the controller, and a ground end of the boost converter is grounded.

Optionally, the booster circuit further includes a power supply filter capacitor;

a first end of the power supply filter capacitor is electrically connected to the power input end of the boost converter, and a second end of the power supply filter capacitor is grounded.

Optionally, the booster circuit further includes an output filter capacitor;

a first end of the output filter capacitor is electrically connected to the load, and a second end of the output filter capacitor is grounded.

Optionally, the voltage feedback module includes a feedback resistor and a feedforward capacitor;

a first end of the feedback resistor and a first end of the feedforward capacitor are electrically connected to the cathode of the rectifier diode, and a second end of the feedback resistor and a second end of the feedforward capacitor are both connected to the feedback end of the boosting module and the first end of the output control resistor.

According to a second aspect of an embodiment of the present disclosure, there is provided a battery device including a battery, a controller, a load, and the booster circuit of the first aspect, wherein:

the battery is electrically connected to the power input end of the boosting module in the booster circuit;

the controller is electrically connected to the enable end of the boosting module;

the load is electrically connected to the cathode of the rectifier diode in the booster circuit.

According to a third aspect of the embodiments of the present disclosure, there is provided an electronic cigarette including an atomizer and the battery device of the second aspect.

The technical solutions provided by the embodiments of the present disclosure may include the following beneficial effects:

In the embodiment of the present disclosure, in the booster circuit, a protection capacitor is disposed between the boosting module and the rectifier diode, and the capacitor has characteristics of blocking alternating current and conducting direct current. In the actual production assembly process of the battery device, even if the load is short-circuited to the ground, since the power source provides direct current, the protection capacitor is located on the line between the power source and the load, the protection capacitor makes the circuit between the power source and the load under direct current is broken, so that the circuit between the power source and ground is also open. In this way, the current in the booster circuit is instantaneously increased due to the connection of the power source and the ground, and the components in the booster circuit are burned out, thereby protecting the components of the booster circuit.

The above general description and the following detailed description are intended to be illustrative and not restrictive.

DRAWINGS

The appended drawings herein are incorporated into the specification and form part of the specification, showing embodiments in conformity with this disclosure and used together with the specification to explain the principles of this disclosure. In the drawing.

| | |
|---|---|
| 1, Boosting Module | 2, Protection Capacitor |
| 3, Rectifier Diode | 4, Voltage Feedback Module |
| 5, Output Control Resistor | 6, Load |
| 7, Controller | 8, Battery |
| 9, Power Supply Filter Capacitor | 10, Output Filter Capacitor |
| 11, Grounding Diode | 101, Inductor |
| 102, Boost Converter | 401, Feedback Resistor |
| 402, Feedforward Capacitor | |

The embodiments of the present disclosure have been shown by the above-described drawings, which will be described in more detail later. The drawings and the text are not intended to limit the scope of the present disclosure in any way, and the description of the present disclosure will be described by those skilled in the art by reference to the specific embodiments.

DETAILED DESCRIPTION OF PREFERRED EMBODIMENTS

Exemplary embodiments will be described in detail herein, examples of which are illustrated in the accompanying drawings. The following description refers to the same or similar elements in the different figures unless otherwise indicated. The embodiments described in the following exemplary embodiments do not represent all embodiments consistent with the present disclosure. Instead, they are merely examples of devices and methods consistent with aspects of the present disclosure as detailed in the appended claims.

Embodiment 1

Figure 1:
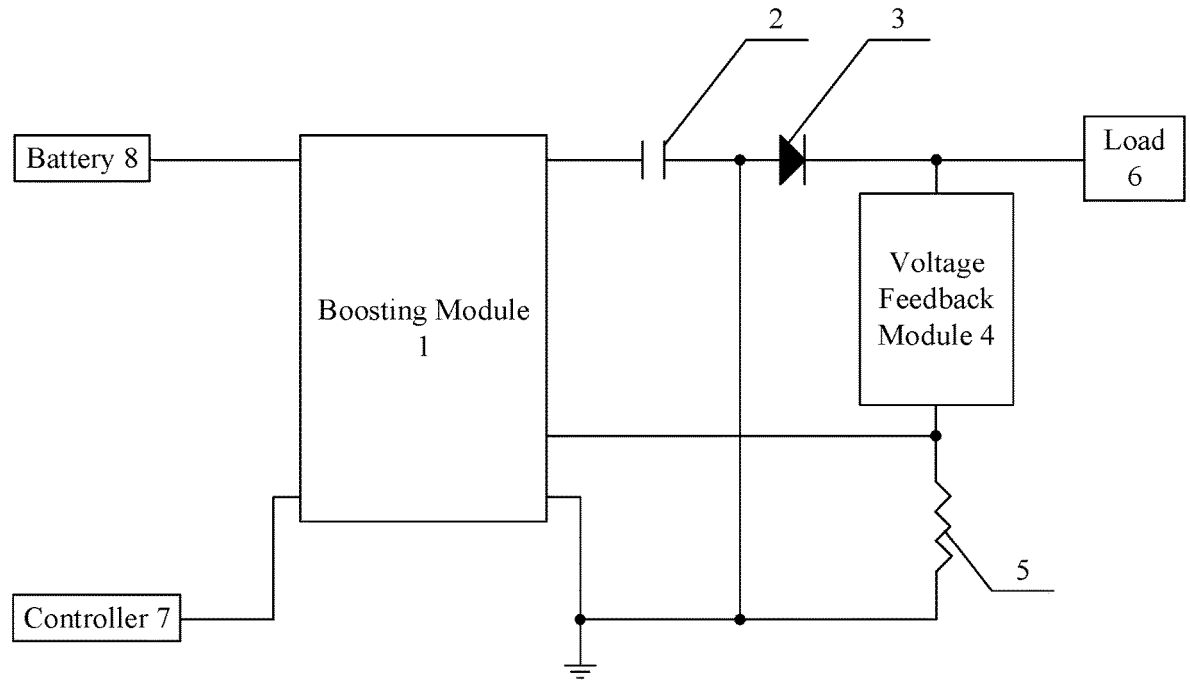
FIG. 1 is a schematic structural diagram of a booster circuit according to an exemplary embodiment.

An exemplary embodiment of the present disclosure provides a booster circuit, as shown in FIG. 1, the booster circuit includes a boosting module 1, a protection capacitor 2, a rectifier diode 3, a voltage feedback module 4, and an output control resistor 5, wherein a power input end of the boosting module 1 is electrically connected to a power source, an output end of the boosting module 1 is electrically connected to a first end of the protection capacitor 2, a second end of the protection capacitor 2 is grounded; an anode of the rectifier diode 3 is electrically connected to the second end of the protection capacitor 2, a cathode of the rectifier diode 3 is electrically connected to a first end of the voltage feedback module 4 and a load 6, wherein conduction direction of the rectifier diode 3 is the direction in which the cathode is directed to the anode thereof; a second end of the voltage feedback module 4 is electrically connected to a feedback end of the boosting module 1 and a first end of the output control resistor 5, and a second end of the output control resistor 5 is grounded; an enable end of the boosting module 1 is electrically connected to a controller 7, a grounding end of the boosting module 1 is grounded, and the protection capacitor 2 is configured to block the power source from directly discharging to the ground when the load 6 is short-circuited.

The booster circuit is applied to a battery device of an electronic cigarette, to supply power to an OLED (Organic Light-Emitting Diode) screen, and may also supply power to a MOS (Metal-Oxide-Semiconductor) transistor driving circuit.

The power source is a power source component for supplying a voltage to the boosting module 1. The power source can be a battery, such as a lithium battery, a nickel-cadmium battery, a nickel-hydrogen battery, etc., which is not limited in this embodiment. For ease of introduction, it can be called a battery.

Figure 2:
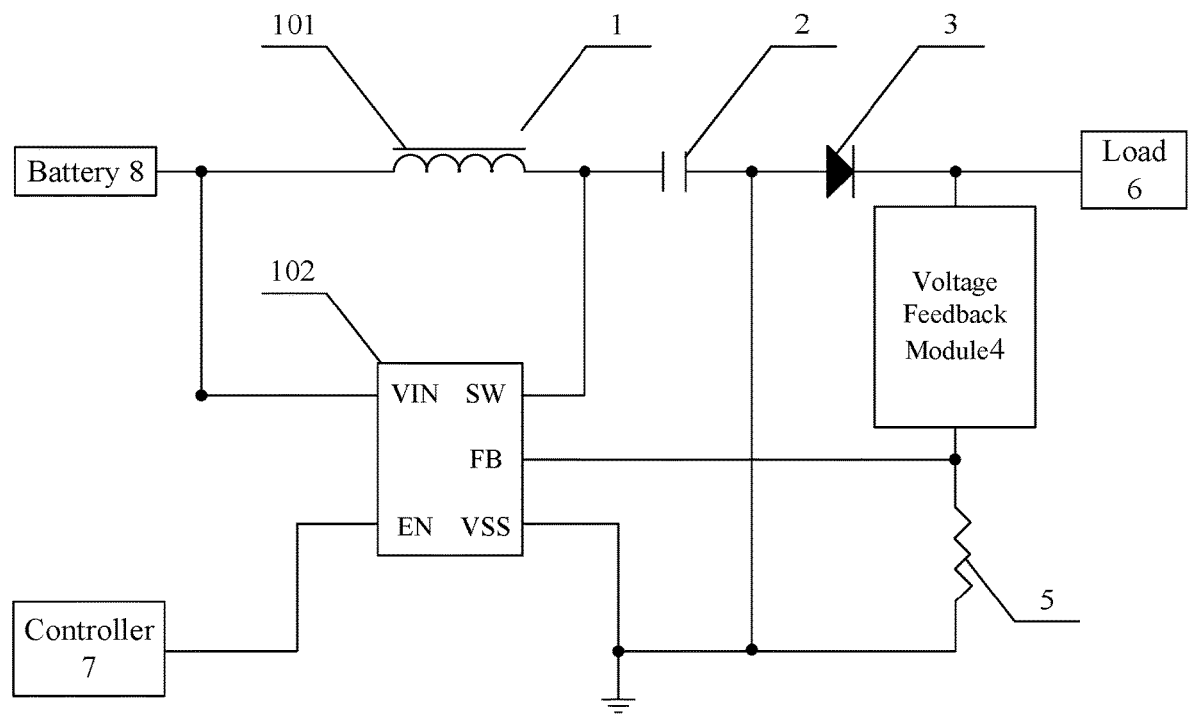
FIG. 2 is a schematic structural diagram of a booster circuit according to an exemplary embodiment.

In an embodiment, as shown in FIG. 2, the boosting module 1 includes an inductor 101 and a boost converter 102. The inductor 101 acts as an energy storage component and can discharge to the load 6. A first end of the inductor 101 and a power input end of the boost converter 102 are electrically connected to the battery 8, and a second end of the inductor 101 and an output end of the boost converter 102 are electrically connected to the first end of the protection capacitor 2.

The boost converter 102 in this embodiment can select a high-frequency low-power boost converter of the type TPS61040, and the switching frequency can reach one megahertz, and can output a voltage between 1.8 volts and 28 volts. As shown in FIG. 2, among the pins in the boost converter 102, SW (switch) is an output end. When the SW pin is turned on, the inductor 101 stores energy. When the SW pin is turned off, the inductor 101 output voltage; VSS (voltage series) is a ground end; FB (feedback) is a feedback end for connecting the voltage feedback module 4; EN (energy, enable) is an enable end, used for connecting the controller 7 to start the operation of the boosting module 1; VIN (voltage in) is a power input end for connecting to the power source.

In the booster circuit described above, a protection capacitor 2 is provided between the inductor 101 and the rectifier diode 3, and the capacitor has characteristics of blocking alternating current and conducting direct current. In the actual production assembly process of the battery device, even if the load is short-circuited to the ground, since the power source provides direct current, the protection capacitor 2 is located on the line between the power source and the load 6, so under direct current the protection capacitor 2 makes the circuit between the power source and the load 6 is broken, so that the circuit between the power source and the ground is also broken. In this way, the current in the booster circuit is instantaneously increased due to the connection of the power source and the ground, and the components in the booster circuit are burned out, thereby protecting the components of the booster circuit.

In this embodiment, the enable end EN of the boost converter 102 is electrically connected to the controller 7 in the battery device, and the controller 7 is configured to control the operation of the boost converter 102. Ground pin of the boost converter 102 is grounded. The basic boosting principle of booster circuit can be as follows:

After the controller 7 outputs an enable signal to the EN pin, the boost converter 102 starts operating, and the boost converter 102 and the inductor 101 oscillate. When the SW pin is turned on, the inductor 101 stores energy, and when the SW pin is turned off, the inductor 101 output voltage. Thus, the intermittent square wave voltage does not belong to direct current, and thus, the intermittent square wave voltage can pass through the protection capacitor 2. After the square wave voltage is rectified by the rectifier diode 3, the voltage is relatively stable, thereby providing a relatively smooth voltage to the load 6. The voltage supplied to the load 6 by the booster circuit is the sum of the voltage of the battery 8 and the self-inductance voltage of the inductor 101 (when the forward voltage drop of the rectifier diode 3 is negligible). The voltage of the battery 8 is usually between 1.5 volts and 4.2 volts, and the self-inductance voltage of the inductor 101 can reach up to 28 volts. Therefore, the booster circuit can supply a voltage of several tens of volts to the load when inputted a voltage of several volts.

Figure 3:
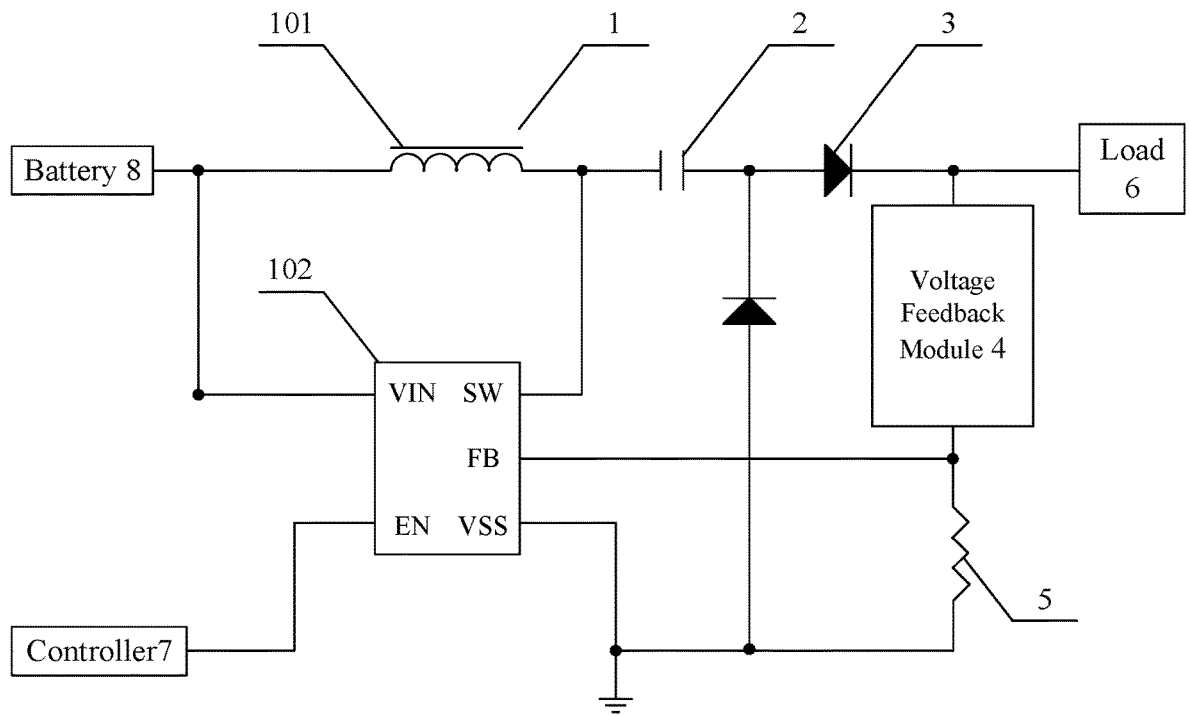
FIG. 3 is a schematic structural diagram of a booster circuit according to an exemplary embodiment.

Wherein, in the process of the square wave voltage flowing through the protection capacitor 2 to the load 6, in order to prevent the protection capacitor 2 from discharging to the ground, the corresponding structure may be that the booster circuit further includes a grounding diode 11, as shown in FIG. 3, the cathode of the grounding diode 11 is electrically connected to the second end of the protection capacitor 2, and the anode of the grounding diode 11 is grounded, wherein conduction direction of the grounding diode 11 is the direction in which the anode is directed to the cathode thereof.

Based on the above, during normal operation of the booster circuit, the boosting module 1 periodically supplies a pulse voltage to the load 6 for the load 6 to operate.

Figure 4:
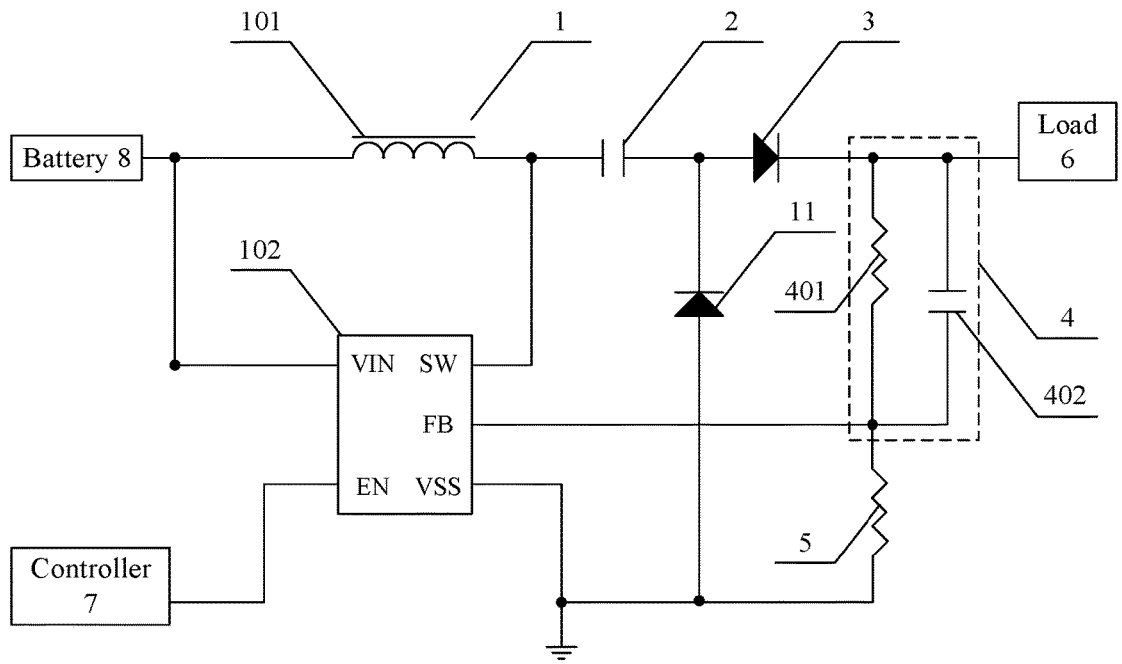
FIG. 4 is a schematic structural diagram of a booster circuit according to an exemplary embodiment.

When the boosting module 1 periodically outputs a pulse voltage, it cannot be regulated during normal operation, and the output voltage is affected by the operating frequency of the boost converter 102 and the size of the inductor 101, so that in order to make the output voltage stable, the voltage feedback module 4 needs to be provided in the booster circuit. As shown in FIG. 4, the voltage feedback module 4 includes a feedback resistor 401 and a feedforward capacitor 402. A first end of the feedback resistor 401 and a first end of the feedforward capacitor 402 are electrically connected to the cathode of the rectifier diode 3. A second end of the feedback resistor 401 and a second end of the feedforward capacitor 402 are electrically connected to the feedback end of the boosting module 1 and the first end of the output control resistor 5.

The relationship between the voltage output by the boosting module 1 and the dividing resistor may be:

$$V\text{out}=(1+R1/R2)V\text{ref}$$

Wherein: Vout is the voltage output by the boosting module 1; R1 is the resistance value of the feedback resistor 401, for example, 470 kohm; R2 is the resistance value of the output control resistor 5, for example, 56 kohm; Vref is the voltage reference value in the boost converter 102 is typically 1.233 volts.

Figure 5:
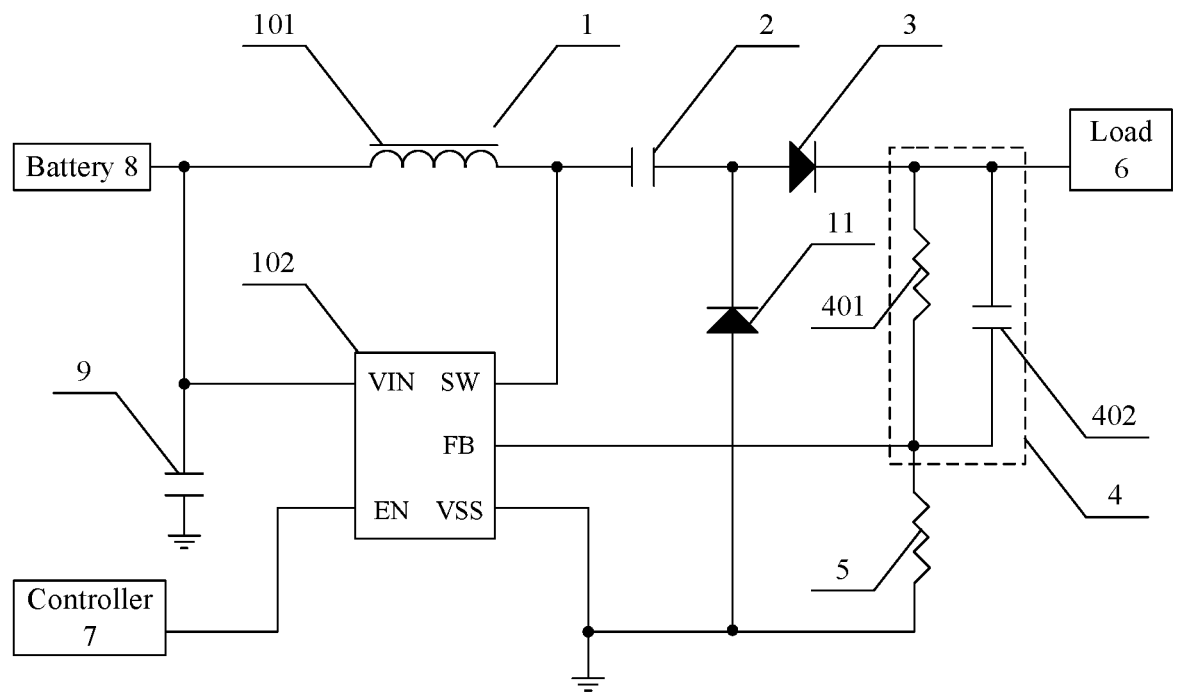
FIG. 5 is a schematic structural diagram of a booster circuit according to an exemplary embodiment.

Optionally, the battery 8 is subjected to interference from the outside (such as a surrounding magnetic field) during it outputting voltage to the boost converter 102. Usually, a capacitor for filtering is disposed at the output end of the power source, and the corresponding structure may be: the booster circuit further includes a power supply filter capacitor 9. As shown in FIG. 5, a first end of the power supply filter capacitor 9 is electrically connected to the input end of the boost converter 102, and a second end of the power supply filter capacitor 9 is grounded.

Figure 6:
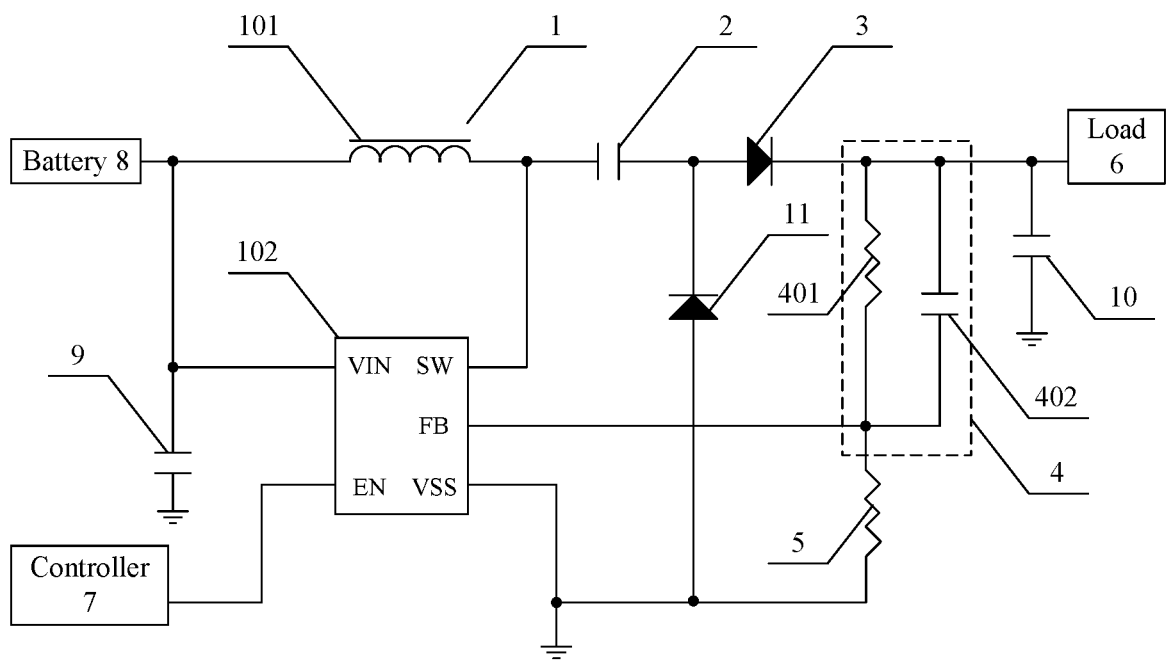
FIG. 6 is a schematic structural diagram of a booster circuit according to an exemplary embodiment.
illustration

Optionally, when the booster circuit outputs a voltage to the load 6, it is also interfered by the surrounding environment. Generally, a capacitor for filtering is disposed at the output end of the booster circuit, and the corresponding structure may be: the circuit also includes an output filter capacitor 10. As shown in FIG. 6, a first end of the output filter capacitor 10 is electrically coupled to the load 6, and a second end of the output filter capacitor 10 is coupled to ground.

In the embodiment of the present disclosure, in the booster circuit, the protection capacitor 2 is provided between the boosting module 1 and the rectifier diode 3, and the capacitor has characteristics of blocking alternating current and conducting direct current. In the actual production assembly process, even if the load 6 is short-circuited to the ground, since the power source provides DC, the protection capacitor 2 is located on the line between the power source and the load 6, so under direct current the protection capacitor 2 makes the circuit between the power source and the load 6 is broken, so that the circuit between the power source and the ground is also broken. In this way, the current in the booster circuit is instantaneously increased due to the connection of the power source and the ground, and the components in the booster circuit are burned out, thereby protecting the components of the booster circuit.

Embodiment 2

Still another exemplary embodiment of the present disclosure shows a battery device including a battery 8, a controller 7, a load 6, and a booster circuit according to the first embodiment, wherein: the battery 8 is connected to the input end of the boosting module 1 of the booster circuit; the controller 7 is electrically connected to the enable end of the boosting module 1; the load 6 is electrically connected to the second end of the rectifier diode 3 of the booster circuit.

In the embodiment of the present disclosure, as described in the first embodiment, in the actual production assembly process, even if a load short circuit to the ground occurs, since the power source provides direct current, the protection capacitor 2 is located on the line between the power source and the load 6, therefore, under direct current the protection capacitor 2 makes the circuit between the power source and the load 6 is broken, so that the circuit between the power source and the ground is also broken. In this way, the current in the booster circuit is instantaneously increased due to the connection of the power source and the ground, and the components in the booster circuit are burned out, thereby protecting the components of the booster circuit.

Embodiment 3

Yet another exemplary embodiment of the present disclosure shows an electronic cigarette including an atomizer and a battery device according to the second embodiment, wherein the atomizer is a component that is powered by electricity to atomize smoking materials such as e-liquid, tobacco shreds, and tobacco paste to produce smoke; the battery device is a power source control component of the electronic cigarette, and can supply an operating voltage to the atomizer.

In the embodiment of the present disclosure, the battery device in the electronic cigarette is as described in the second embodiment. In the actual production assembly process of the battery device, even if the load is short-circuited to the ground, since the power source provides direct current, the protection capacitor 2 is located on the line between the power source and the load 6, so under direct current the protection capacitor 2 makes the circuit between the power source and the load 6 is broken, so that the circuit between the power source and the ground is also broken. In this way, the current in the booster circuit is instantaneously increased due to the connection of the power source and the ground, and the components in the booster circuit are burned out, thereby protecting the components of the booster circuit.

Those skilled in the art will readily contemplate other embodiments of the present disclosure after considering the specification and practicing the disclosure disclosed herein. This application is intended to cover any variations, uses, or adaptations of this disclosure that conform to the general principles of this disclosure and include the common general knowledge or conventional technical means in the technical field not disclosed by this disclosure. It is intended that the specification and examples be considered as exemplary only, with a true scope and spirit of the disclosure being indicated by the following claims.

It is to be understood that the invention is not limited to the details of the details and the scope of the disclosure is to be limited only by the appended claims.

What is claimed is:

1. A booster circuit, wherein the booster circuit comprises a boosting module, a protection capacitor, a rectifier diode, a voltage feedback module and an output control resistor, wherein:
    a power input end of the boosting module is electrically connected to a power source, an output end of the boosting module is electrically connected to a first end of the protection capacitor, and a second end of the protection capacitor is grounded;
    an anode of the rectifier diode is electrically connected to the second end of the protection capacitor, and a cathode of the rectifier diode is electrically connected to a first end of the voltage feedback module, respectively, wherein conduction direction of the rectifier diode is the direction in which the anode is directed to the cathode thereof;
    a second end of the voltage feedback module is electrically connected to a feedback end of the boosting module and a first end of the output control resistor, and a second end of the output control resistor is grounded;
    an enable end of the boosting module is electrically connected to a controller, and a ground end of the boosting module is grounded;
    the protection capacitor is configured to block the power source from directly discharging to the ground when the load is short-circuited;
    wherein the boosting module comprises an inductor and a boost converter;
    a first end of the inductor and a power input end of the boost converter are electrically connected to the power source, and a second end of the inductor and an output end of the boost converter are electrical connected to the first end of protection capacitor;
    a feedback end of the boost converter is electrically connected to the second end of the voltage feedback module and the first end of the output control resistor;
    an enable end of the boost converter is electrically connected to the controller, and a ground end of the boost converter is grounded.

2. The booster circuit according to claim 1, wherein the booster circuit further comprises a grounding diode;
    a cathode of the grounding diode is electrically connected to the second end of the protection capacitor, and an anode of the grounding diode is grounded, wherein the conducting direction of the grounding diode is the direction in which the cathode is directed to the anode thereof.

3. The booster circuit according to claim 1, wherein the booster circuit further comprises a power supply filter capacitor;
    a first end of the power supply filter capacitor is electrically connected to the power input end of the boost converter, and a second end of the power supply filter capacitor is grounded.

4. The booster circuit according to claim 1, wherein said booster circuit further comprises an output filter capacitor;
    a first end of the output filter capacitor is electrically connected to the load, and a second end of the output filter capacitor is grounded.

5. The booster circuit according to claim 1, wherein the voltage feedback module comprises a feedback resistor and a feedforward capacitor;
    a first end of the feedback resistor and a first end of the feedforward capacitor are electrically connected to the cathode of the rectifier diode, and a second end of the feedback resistor and a second end of the feedforward capacitor are both connected to the feedback end of the boosting module and the first end of the output control resistor.

6. A battery device, comprising: a battery, a controller, a load, and the booster circuit of claim 1, wherein:
    the battery is electrically connected to the power input end of the boosting module in the booster circuit;
    the controller is electrically connected to the enable end of the boosting module;
    the load is electrically connected to the cathode of the rectifier diode in the booster circuit.

7. An electronic cigarette, wherein the electronic cigarette comprises an atomizer and the battery device of claim 6.

8. The booster circuit according to claim 2, wherein the voltage feedback module comprises a feedback resistor and a feedforward capacitor;

a first end of the feedback resistor and a first end of the feedforward capacitor are electrically connected to the cathode of the rectifier diode, and a second end of the feedback resistor and a second end of the feedforward capacitor are both connected to the feedback end of the boosting module and the first end of the output control resistor.

9. The booster circuit according to claim 3, wherein the voltage feedback module comprises a feedback resistor and a feedforward capacitor;
   a first end of the feedback resistor and a first end of the feedforward capacitor are electrically connected to the cathode of the rectifier diode, and a second end of the feedback resistor and a second end of the feedforward capacitor are both connected to the feedback end of the boosting module and the first end of the output control resistor.

10. The booster circuit according to claim 4, wherein the voltage feedback module comprises a feedback resistor and a feedforward capacitor;
   a first end of the feedback resistor and a first end of the feedforward capacitor are electrically connected to the cathode of the rectifier diode, and a second end of the feedback resistor and a second end of the feedforward capacitor are both connected to the feedback end of the boosting module and the first end of the output control resistor.

11. A battery device, comprising: a battery, a controller, a load, and the booster circuit of claim 2, wherein:
   the battery is electrically connected to the power input end of the boosting module in the booster circuit;
   the controller is electrically connected to the enable end of the boosting module;
   the load is electrically connected to the cathode of the rectifier diode in the booster circuit.

12. A battery device, comprising: a battery, a controller, a load, and the booster circuit of claim 4, wherein:
   the battery is electrically connected to the power input end of the boosting module in the booster circuit;
   the controller is electrically connected to the enable end of the boosting module;
   the load is electrically connected to the cathode of the rectifier diode in the booster circuit.

13. A battery device, comprising: a battery, a controller, a load, and the booster circuit of claim 4, wherein:
   the battery is electrically connected to the power input end of the boosting module in the booster circuit;
   the controller is electrically connected to the enable end of the boosting module;
   the load is electrically connected to the cathode of the rectifier diode in the booster circuit.

14. A battery device, comprising: a battery, a controller, a load, and the booster circuit of claim 5, wherein:
   the battery is electrically connected to the power input end of the boosting module in the booster circuit;
   the controller is electrically connected to the enable end of the boosting module;
   the load is electrically connected to the cathode of the rectifier diode in the booster circuit.

* * * * *